United States Patent Office 3,306,357
Patented Feb. 28, 1967

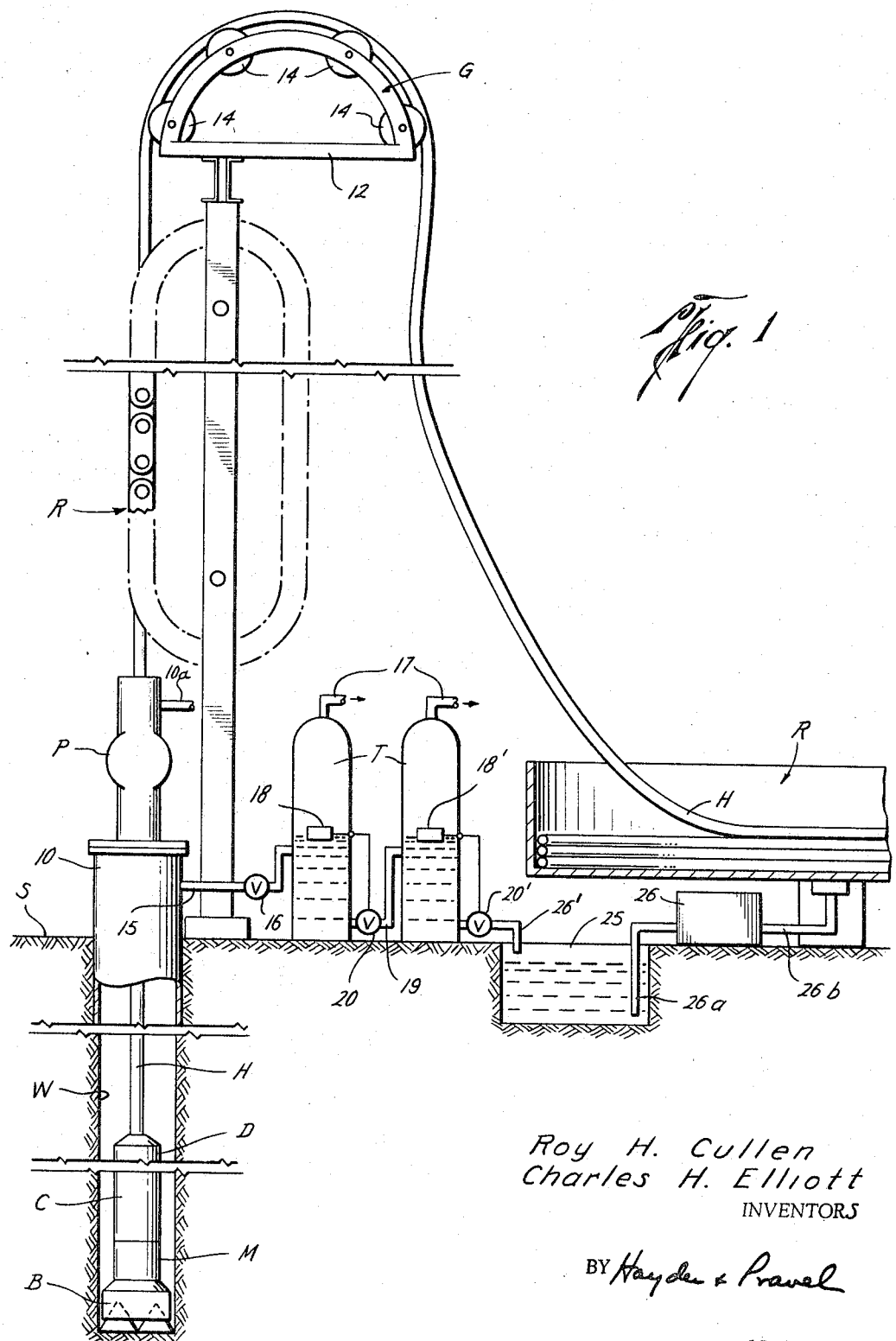

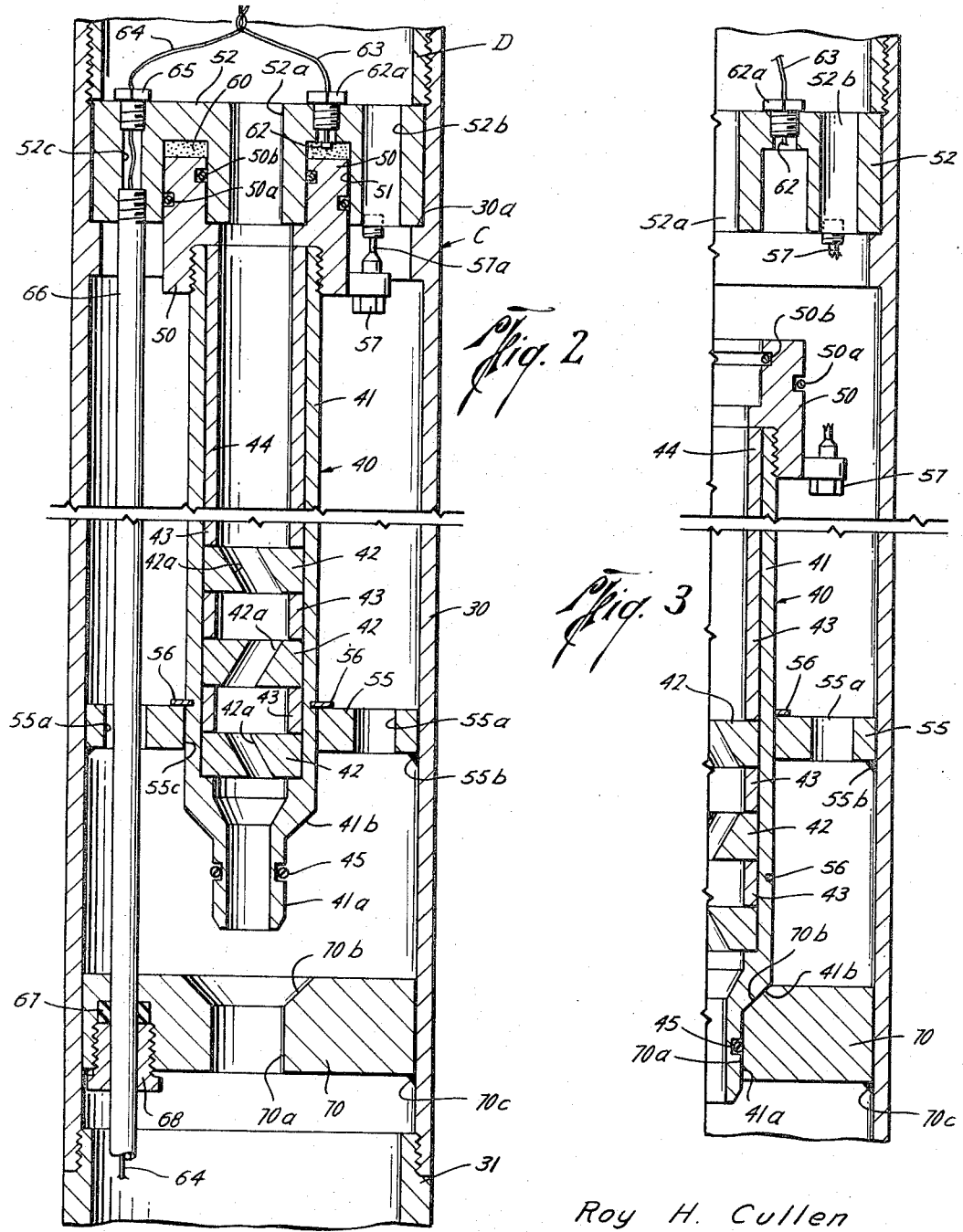

3,306,357
FLOW LINE PRESSURE CONTROL
Roy H. Cullen, Suite 1931, 500 Jefferson Bldg., Houston, Tex. 77002, and Charles H. Elliott, Houston, Tex.; said Elliott assignor to said Cullen
Filed July 22, 1964, Ser. No. 384,429
7 Claims. (Cl. 166—63)

This invention relates to new and useful improvements in flow line pressure controls, and particularly downhole chokes or controllers adapted to be positioned in flexible drill stems or hoses for controlling the pressure of fluid flowing through the interior thereof.

In drilling a well with a drill bit supported on flexible hose, such as the hose disclosed in U.S. Patent 3,136,113, the upper end of the hose at the ground level or surface may be closed off in the event of a well blowout or similar conditions by closing a blowout preventer on the hose. At the time of such closing of the blowout preventer, the pressure of the drilling mud or other fluid inside of the hose should be at least as great as the pressure of the drilling mud or other fluid in the casing annulus to prevent a collapse of the entire flexible hose. To the extent that such collapse of the hose might occur, it probably would so damage that part of the hose that further use thereof would be difficult, if not impossible. Since blowouts are expected to occur after drilling has progressed to a substantial depth, as much as one or two miles of hose, or even more, may thus be lost or damaged if the pressure in the hose drops below that in the casing annulus.

It is therefore, an object of the present invention to provide a new and improved line pressure control or choke for controlling the pressure of the fluid in a flexible drill stem or hose to prevent collapsing thereof by reason of a casing annulus pressure which is higher than the pressure in the drill stem or hose.

An important object of this invention is to provide a downhole choke or controller for disposition in the lower end of a flexible drill stem or hose to control the pressure of fluid in the drill stem or hose for preventing a collapse of the tubing due to a blowout in the well.

Another object of this invention is to provide a new and improved downhole choke or controller adapted to be disposed in a flexible drill stem or hose, such choke or controller being normally inactive but being activated to an operating position by an operator at the ground level or surface when he observes that the well is beginning to blow out.

A further object of this invention is to provide a new and improved downhole choke or controller adapted to be disposed in a flexible drill stem or hose so as to normally permit substantially unrestricted fluid flow therethrough but which is actuable for directing all, or substantially all, of the fluid flow in the drill stem or hose through the choke to thereby restrict such flow and develop an increased pressure in the drill stem or hose.

A particular object of this invention is to provide a new and improved choke or fluid flow controller which is operable electrically from a remote point at a desired time.

Still another object of this invention is to provide a new and improved choke or fluid flow controller adapted to be positioned in a flexible hose, wherein such choke or controller has multiple orifices therein which are successively reduced in size to cause successive pressure changes in the fluid flow, whereby excessive changes in the fluid velocity is minimized to thereby reduce or avoid cutting action by the fluid.

Still a further object is to provide a new and improved apparatus for preventing collapse of a resilient drilling hose or the like by fluid pressure, wherein annnulus pressure control means is provided for acting in conjunction with a choke in the hose to control the fluid pressure of mud or other fluid in the hose and the annulus around the hose while circulating such mud or other fluid.

A specific object of this invention is to provide a new combination of an annulus pressure control means operably connected to the annulus around a drilling hose or the like and a choke disposed in the hose or the like near the lower end thereof for maintaining the pressure internally of the hose at least equal to the pressure in the annulus, even after a blowout preventer closes off the annulus around the hose.

The preferred embodiment of this invention will be described hereinafter, together with other features thereof, and additional objects will become evident from such description.

The invention will be more readily understood from a reading of the following specification and by reference to the accompanying drawings forming a part thereof, wherein an example of the invention is shown, and wherein:

FIG. 1 is an elevation, partly schematic, to illustrate a typical apparatus in which the invention is utilized;

FIG. 2 is a vertical sectional view of the flow line controller or choke of this invention in its normal operating position; and, FIG. 3 is a quarter-sectional view showing only the right-hand portion of the controller or choke of this invention after the controller or choke has been released to its choke position.

In the drawings, the letter C refers generally to the fluid flow controller or choke of this invention. Briefly, in the preferred form of the invention, the controller or choke C is adapted to be used at the lower end of a drilling hose or stem H, one type of which is illustrated in United States Patent No. 2,825,364. As will be more evident hereinafter, the hose H normally has drill collars D of conventional construction, preferably thickwalled steel pipe, disposed below the flexible hose H. The controller or choke C of this invention is mounted either above or below such drill collars D. The hose H is adapted to supply drilling mud or fluid from the ground level or surface S through the drill collars D and the controller C to a fluid driven motor M which drives a conventional drill bit B for forming the well bore W.

Typically, the hose or drill stem H is lowered into, and removed from, the well bore W by means of a retractor apparatus R, such as that illustrated in U.S. Patent No. 2,892,535. A casing 10 of conventional construction is disposed in a well bore W, with a blowout preventer P mounted thereon and through which the hose H passes freely during normal operating conditions. The hose H extends over a guide assembly G which has a frame 12 and a plurality of rollers 14 for guiding the hose H from a reel R disposed at or near the ground level or surface S. Such reel R, shown schematically in FIG. 1, is preferably of the construction illustrated in U.S. Patent No. 2,989,980. In normal drilling operations, the mud or fluid in the annulus of the well bore W circulates upwardly around the hose H and is discharged above the blowout preventer P through a suitable outlet pipe 10a for flow to a shale shaker or other device for separating cuttings and then to a mud pit. However, when the blowout preventer P is closed around the hose H so as to close the annulus, the circulating mud no longer flows to the outlet pipe 10a, but instead annulus pressure control means are provided in this invention, which as will be more evident, acts in conjunction with the controller or choke C to control the fluid pressure in both the annulus and the hose to prevent collapse of the hose while circulating mud therethrough even after the blowout preventer is closed.

The annulus pressure control means may take numerous forms, such as an ordinary choke at the surface which is connected in line 15 leading from the casing 10 below the blowout preventer P. However, the preferred annulus pressure control means includes one or more separator tanks T which are provided for receiving the drilling mud or fluid which returns through the annulus externally of the hose H within the casing 10 and the well bore W. Such return mud flows through the discharge pipe 15 and a valve 16 to the interior of the first separator tank T where the gas discharges through the outlet pipe 17 to a suitable point for use or disposal. It should be noted that during normal drilling operations, the valve 16 is closed.

A pivoted float 18 of conventional construction is provided in the separator T to maintain the mud or liquid level as indicated while allowing the gas to escape from the liquid in the upper part of the tank T and thus to the outlet pipe 17. If a second separator tank T is used, the mud is transferred thereto through line 19 having a dump valve 20 therein which is opened and closed by the action of the float 18, as is well understood. The second tank T has a float 18' corresponding to the float 18 and which is connected to a dump valve 20' for regulating the discharge and outlet of the mud into a mud pit 25 from a line 26'. The same mud pit 25 is normally used for receiving the mud from the line 10a during normal drilling operations.

A mud pump 26 is connected to the mud pit 25 through an inlet or suction pipe 26a so that mud is pumped from the pit 25 through an outlet pipe 26b to the end of the hose H which is fastened in the reel R. Thus, mud is constantly supplied as needed to the hose H during the usual drilling operations and also for killing the well to avoid a blowout, as will be more evident.

Considering the details of the preferred form of the choke or controller C as illustrated in FIGS. 2 and 3, such controller or choke C has a tubular housing 30 which may be in one or more parts for ease of assembly and manufacture. The upper end of the housing 30 is threaded or otherwise connected to the lowermost drill collar D, only a portion of which is illustrated in FIG. 2. The lower end of the housing 30 is threaded or otherwise suitably connected to the motor housing 31 which may be of any suitable configuration for housing the motor M illustrated in FIG. 1. Other locations for the flow controller or choke C of this invention may be utilized so long as such controller or choke C is near the lower end of the hose H so as to control the pressure of the fluid therein when it becomes necessary, as will be more fully explained.

A choke assembly 40 having a cylindrical choke body 41 is disposed within the tubular housing 30. Although the choke assembly 40 may be constructed in numerous ways, it preferably is constructed as illustrated in FIG. 2 with a plurality of choke elements 42, each of which has a choke orifice 42a therethrough at an angle and with the diameters being successively reduced from the upper to the lower choke elements 42. The choke elements 42 are separated by spacer rings 43 or other suitable means, the number of the choke elements 42 being selected for minimizing the pressure drop from each of the elements 42 to the next, thereby minimizing abrasive action on the choke elements as the mud flows through the orifices 42a of the choke elements 42. The uppermost choke element 42 may be held in place by an extra long retaining sleeve 44, although in some instances, the choke elements 42 may extend upwardly to such an extent that the length of the sleeve 44 is equal to, or approximately equal to, that of the other spacers 43.

The lower end of the choke assembly body 41 is reduced in its diameter and is provided with a smaller diameter portion 41a which carries an O-ring 45 for a purpose to be hereinafter explained. A tapered seating surface 41b is provided above the smaller diameter portion 41a on the body 41.

The upper end of the choke assembly 40 has an annular piston 50 threaded or otherwise connected thereto, with outside seal 50a and inside seal 50b provided so as to provide a fluid-tight seal with the internal walls of a piston chamber 51. Such chamber 51 is formed in a circular disc or plate 52 which has a central opening 52a therethrough communicating with the bore of the choke assembly 40. The disc or plate 52 also has at least one, and preferably three additional longitudinal openings 52b through which drilling mud passes to flow around the exterior of the choke assembly 40 under normal operating conditions.

The plate 52 may be mounted in the housing 30 as an integral part thereof, but preferably it is removably disposed on an annular shoulder 30a and it may be locked in place by the lower end of the lowermost drill collar D as illustrated in FIG. 2 in particular.

A support disc or plate 55 having at least one, and preferably three openings 55a longitudinally therethrough is suitably supported and connected internally of the housing 30, normally by welding such as indicated at 55b. The support member 55 has a central opening 55c which is at least large enough for the body 41 of the choke assembly 40 to move slidably therein when the assembly 40 is released for movement.

During the normal operation, prior to the need of the choke assembly 40, the assembly 40 is releasably supported in the position shown in FIG. 2 by any suitable shearable means. In FIG. 2, two types of shearable means are illustrated, although both of such shearable means are normally not employed together. For example, one of the shearable means includes shear pins 56 which extend into the wall of the body 41 and which rests upon the upper surface of the support member or plate 55 to prevent downward movement of the choke assembly 40 until the pins 56 have been sheared by a force acting above, as will be more fully evident hereinafter. It is also possible to provide a shearable means such as the shearable bolt 57 which is threaded into the lower surface of the plate 52. The shearable bolt 57 is offset rearwardly from the plane of FIG. 2 and therefore actually is behind the opening 52b illustrated in FIG. 2 so that it is threaded upwardly into the plate 52. The narrow portion 57a is reduced in diameter to provide a predetermined amount of force before shearing. Normally when the shear bolts 57 are used without the shear pins 56, at least two, and preferably three of such shear bolts 57 are employed and are mounted in the same manner as illustrated for the single shear bolt 57 illustrated in FIG. 2.

The shearable means, whether the shear pins 56, or the shear bolts 57, or both, are severed or sheared in the preferred form of the invention by an explosive means which includes an explosive powder 60 disposed in the annular chamber 51 above the upper end of the annular piston 50. The detonator means used for igniting the explosive 60 may take numerous forms, but for simplicity of illustration, FIG. 2 illustrates an igniter 62 which is extended into the powder 60 and which is adapted to provide a spark from the electricity supplied through electrical wires 63. Such wires 63 may be carried downwardly with the normal supply of electrical current to the motor M through electrical wires 64, or in some instances, a condenser may be used and high frequency voltage applied in brief spurts through the same wires to detonate the explosive powder 60. In any event, the explosive powder 60 is detonated by remote control at the ground level or surface by an operator who applies a sufficient amount of voltage and current to provide the spark or heat to ignite the powder and cause a downward movement of the piston 50 to shear the shearable means holding the choke assembly 40 in the position of FIG. 2.

The usual electrical wires 64 which extend to the motor may be suitably passed downwardly through the plate 52 by means of an opening 52c provided therein which has a water tight fitting 65 threaded at its upper end. A water tight conduit 66 is threaded at the lower end of the opening 52c and extends downwardly through one of the openings 55a and then into a water tight seal 67 which is retained therein by a bushing or packing gland 68 disposed in the plate providing the choke seat, identified generally with the numeral 70.

The choke seat is provided in the plate 70 by a central opening 70a which has a diameter approximating that of the external surface of the body portion 41a and which is adapted to be contacted for sealing by the O-ring seal 45. The opening 70a is flared or tapered outwardly at 70b to conform substantially with the taper of the surface 41b to thereby provide a guide to assure the entry of the lower portion 41a into the opening 70a and to subsequently seat the surface 41b on the surface 70b as shown in FIG. 3. It is to be noted that the choke seat plate 70 is preferably welded as indicated at 70c to the interior of the housing 30, although other connecting means may be provided if desired.

In the normal use of the fluid flow controller or choke C of this invention, it is disposed in an apparatus having a hose H connected thereabove as illustrated in FIG. 1 of the drawings, and as previously explained. Under normal drilling operations, the drilling mud is circulated by the mud pump 26 through the hose H to the lower end of the drill bit B where it is discharged and then returns to the surface through the line 10a which leads to a shale shaker (not shown) and then to the mud pit 25. During such normal use of the apparatus illustrated in FIG. 1 for drilling purposes, the choke assembly 40 (FIG. 2) is in its upper or supported position with the lower end of the choke assembly 40 spaced above the choke seat 70a and the inclined seat surface 70b. The drilling mud or fluid flows downwardly through the hose H, the drill collars D and then flows around the choke assembly 40 by passing through the openings 52b into the annular area within the housing 30 externally of the choke assembly 40. The longitudinal openings 55a then provide for continued flow of the drilling mud or fluid downwardly around the choke assembly 40 and ultimately for flow through the choke seat 70a and then for flow downwardly to the drill bit B of conventional construction. The seals 65 and 62a in the plate 52 prevent the drilling mud from entering the areas where the electrical wires 63 and 64 pass into and through the plate 52. Thus the powder 60 within the chamber 51 is kept dry at all times while the mud is flowing and the electrical wires are prevented from being shorted out inadvertently.

When the operator observes from his driller's console at the surface that more drilling mud or fluid is coming out of the well than is being pumped into it, he is alerted to the fact that the well is beginning to blow out. If, at that point, the operator should immediately close the blowout preventer P (FIG. 1), he might produce a condition wherein the pressure of the mud within the hose H is lower than the pressure of the mud externally of the hose H in the casing annulus, thereby resulting in a collapse of a substantial length of the hose H due to the pressure of the mud externally of the hose H. However, with this invention, upon observing that the well is beginning to blow out, the operator at the surface of the well immediately supplies the electricity through the wires 63 to the detonator means 62 and thereby ignites the explosive powder 60. As previously pointed out, such wires 63 may be separate from the wires 64, or may be in a circuit therewith so that high frequency current would be supplied through a condenser (not shown) in order to obtain the ignition of the explosive powder 60.

In any event, the explosion of the powder 60 causes the piston 50 to move downwardly to thereby shear the shearable means supporting the choke assembly 40 within the housing 30. The choke assembly 40 moves downwardly to seat the lower end of the assembly 40 in the choke seat 70a so that seal 45 prevents further flow through the choke seat 70a. Thereafter all or substantially all of the drilling mud or fluid is directed through the opening 52a and the bore of the choke assembly 40 so as to develop a greater pressure within the hose H than theretofore present. The operator at the surface of the well can observe on his driller's console that the pressure of the mud within the hose H is building up to a value greater than the annulus pressure at the top of the well. Normally, several thousand pounds pressure is developed within the hose H prior to the closing of the blowout preventer. Prior to closing the preventer P, such pressure in the hose H is normally regulated by controlling the speed of the mud pump.

When the pressure within the hose H has reached an amount at least equal to, and preferably somewhat greater than, the pressure which is anticipated in the casing annulus after the blowout preventer P is closed, then the blowout preventer P is closed to prevent a blowout of the well and thereby control the well.

When the blowout preventer P is closed, flow through the outlet pipe 10a is cut off by the preventer P and therefore an operator opens the valve 16 to place the annulus pressure control means into operation. A back pressure is developed by such control means so that the pressure of the mud in the annulus of the well bore W is thus controlled on the outlet side, after the blowout preventer P is closed. The operator may regulate such pressure in the annulus by controlling the liquid level in the tanks T with the dump valves 20 and 20', and also by regulating the pressure and volume of gas coming from the separators T. The annulus pressure control means therefore acts in conjunction with the choke or controller C to maintain the pressure internally of the hose H at least equal to the pressure in the annulus after the blowout preventer P is closed.

The foregoing disclosure and description of the invention is illustrative and explanatory thereof and various changes in the size, shape and materials, as well as in the details of the illustrated construction, may be made within the scope of the appended claims without departing from the spirit of the invention.

What is claimed is:

1. A fluid flow controller for use in a flexible hose, comprising:
    (a) a tubular housing section,
    (b) a choke assembly disposed in said housing section,
    (c) a choke seat in said housing below said choke assembly for the flow of fluid therethrough,
    (d) means for releasably supporting said choke assembly in said housing spaced from said choke seat,
    (e) said housing having passage means for flowing fluid around said choke assembly and through said choke seat when said choke assembly is spaced from the choke seat, and
    (f) explosive means for applying an explosive force to said choke asesmbly to move it to a seated position on said choke seat.

2. A fluid flow controller for use in a flexible hose, comprising:
    (a) a tubular housing section,
    (b) a choke assembly disposed in said housing section,
    (c) a choke seat in said housing below said choke assembly for the flow of fluid therethrough,
    (d) shearable means for releasably supporting said choke assembly in said housing above said choke seat,
    (e) said housing having passage means for flowing fluid around said choke assembly and through said choke seat when said choke assembly is spaced from the choke seat, and
    (f) means for releasing said choke assembly for movement to a seated position in said choke seat to thereby direct fluid from only said choke assembly through said choke seat.

3. A fluid flow controller for use in a flexible hose, comprising:
    (a) a tubular housing section,
    (b) a choke assembly disposed in said housing section,
    (c) a choke seat in said housing below said choke assembly for the flow of fluid therethrough, (d) shearable means for releasably supporting said choke assembly in said housing above said choke seat, (e) said housing having passage means for flowing fluid around said choke assembly and through said choke seat when said choke assembly is spaced from the choke seat, and (f) explosive means for applying an explosive force to shear said shearable means for moving said choke assembly to a seated position on said choke seat.

4. A fluid flow cotnroller for use in a flexible hose, comprising:

(a) a tubular housing section, (b) a choke assembly disposed in said housing section, (c) a choke seat in said housing below said choke assembly for the flow of fluid therethrough, (d) support means for releasably supporting said choke assembly in said housing spaced from said choke seat, (e) said housing having passage means for flowing fluid around said choke assembly and through said choke seat when said choke assembly is spaced from the choke seat, (f) said support means including an annular explosive powder chamber, (g) an annular piston on the upper end of said choke assembly extending into said chamber and slidable relative thereto, and (h) detonator means for detonating explosive powder in the chamber for moving said piston and the choke assembly therewith to a seated position on said choke seat.

5. A choke assembly adapted to be used in a fluid flow line, comprising:

(a) a tube having a plurality of choke elements therein, (b) a spacer element between each of the adjacent choke elements to provide a chamber therebetween, (c) each of the choke elements having an inclined orifice therethrough, and (d) said choke elements being disposed with successively smaller orifice openings from the upper to the lower elements in the assembly.

6. A fluid flow controller for controlling fluid flowing in a flexible hose, comprising:

(a) a tubular housing section connected to the flexible hose near its lower end when the hose is disposed in a well, (b) a choke member disposed in said housing section, (c) means mounting said choke member for longitudinal movement relative to said housing section, (d) actuating means in said housing section for moving said choke member longitudinally relative to said housing section, and (e) means operable at the upper end of the well and independently of the fluid flowing in the flexible hose for operating said actuating means to impart longitudinal movement to the choke member for restricting fluid flow in the flexible hose.

7. The structure set forth in claim 6, wherein said flexible hose has a drill bit therewith, and including:

(a) means for circulating fluid downwardly in the drilling hose for performing drilling operations with the drill bit, and (b) a blowout preventer for closing the upper portion of the annulus around the hose in the event a well blowout is indicated.

References Cited by the Examiner

UNITED STATES PATENTS

| | | | |
|---|---|---|---|
| 1,965,563 | 7/1934 | Bannister | 175—103 |
| 2,028,478 | 1/1936 | Schuessler | 175—317 |
| 2,316,383 | 4/1943 | Abercrombie | 166—91 |
| 2,865,602 | 12/1958 | Whittle | 175—107 |
| 3,109,459 | 11/1963 | Lee et al. | 138—40 |
| 3,116,781 | 1/1964 | Rugeley et al. | 175—103 |
| 3,130,747 | 4/1964 | Benaway | 138—43 |
| 3,194,325 | 7/1965 | Gianelloni | 175—107 |
| 3,208,355 | 9/1965 | Baker et al. | 166—63 |

FOREIGN PATENTS

| | | |
|---|---|---|
| 1,057,107 | 3/1954 | France. |

CHARLES E. O'CONNELL, *Primary Examiner.*

JAMES A. LEPPINK, *Examiner.*